(12) United States Patent
Reichert

(10) Patent No.: US 6,497,610 B1
(45) Date of Patent: Dec. 24, 2002

(54) PROCESS FOR DRESSING AN INTERNAL OR EXTERNAL GEAR TOOL FOR FINE MACHINING OF TOOTH PROFILES

(75) Inventor: Gerhard Reichert, Maisach (DE)

(73) Assignee: The Gleason Works, Rochester, NY (US)

( * ) Notice: Subject to any disclaimer, the term of this patent is extended or adjusted under 35 U.S.C. 154(b) by 36 days.

(21) Appl. No.: 09/658,147

(22) Filed: Sep. 8, 2000

(30) Foreign Application Priority Data

Sep. 17, 1999 (EP) .............................................. 99117995

(51) Int. Cl.⁷ .......................... B24B 1/00; B24B 49/00; B24B 51/00
(52) U.S. Cl. ............................... 451/5; 451/21; 451/47; 451/56
(58) Field of Search ................................ 451/5, 21, 47, 451/56, 72, 8; 409/33, 37, 49, 38, 11, 12, 50, 51

(56) References Cited

U.S. PATENT DOCUMENTS

| | | | | |
|---|---|---|---|---|
| 5,443,338 A | * | 8/1995 | Huber et al. | 451/147 |
| 5,651,721 A | * | 7/1997 | Schriefer | 451/11 |
| 5,738,569 A | * | 4/1998 | Mackowsky | 451/324 |
| 5,954,568 A | * | 9/1999 | Wirz | 125/11.01 |
| 6,190,241 B1 | * | 2/2001 | Schriefer | 451/10 |
| 6,217,409 B1 | * | 4/2001 | Stadtfeld et al. | 451/147 |
| 6,234,880 B1 | * | 5/2001 | Scacchi | 451/443 |

FOREIGN PATENT DOCUMENTS

DE          19500801          9/1996

* cited by examiner

Primary Examiner—Timothy V. Eley
(74) Attorney, Agent, or Firm—Robert L. McDowell

(57) ABSTRACT

A process for dressing a tool, a honing tool in particular, introduced into a machine for fine machining of the tooth profiles of gear workpieces, with a dressing wheel which is engaged with the tool to be dressed in place of a gear workpiece and is caused to rotate. To achieve optimum cutting conditions the use is provided of a dressing wheel with a helix angle differing from that of the gear workpiece, an axis intersection angle different from that for fine machining of gear workpieces being set for dressing in order to obtain the assigned helix angle of the tool.

3 Claims, 2 Drawing Sheets

PROCESS FOR DRESSING AN INTERNAL OR EXTERNAL GEAR TOOL FOR FINE MACHINING OF TOOTH PROFILES

FIELD OF THE INVENTION

The invention relates to a process for dressing an internal or external gear tool, in particular a honing tool, mounted in a machine for fine machining of the tooth profiles of gear workpieces, with a dressing wheel which is engaged with the tool to be dressed in place of a gear workpiece and is set in rotation.

BACKGROUND OF THE INVENTION

In conventional fine machining, known among other things also as tooth honing, of the tooth profiles of specially hardened workpieces in the form of gears with a tool whose flanks have an abrasive surface, that is, no uniformly oriented cutting edges, the tool must be dressed at specific time intervals. For this purpose the tool is generated with a dressing wheel whose tooth profiles are provided with a coating of granular diamond or other hard material. It is customary to leave the tool in the fine finishing machine and to replace the workpiece to be machined with a dressing wheel possessing the identical basic gear data. However, even if the greatest possible care is taken in dressing, the result and accordingly the quality of the gear workpieces subsequently machined with the dressed tool often are not satisfactory. The conventional generic process (DE 195 00 801 C2) provides for use of a dressing gear with a number of teeth greater than those of the gear workpiece. The modulus and helix angle are, however, identical to those of the gear workpiece, and the axis intersection angle (i.e. cross axis angle) in the dressing of the tool corresponds more or less to that employed in fine machining of the gear workpiece.

In machining of gear workpieces with a so-called disruptive profile, such as a shoulder projecting radially, limits are naturally imposed on the axis intersection angle. If this limit of the axis intersection angle is exceeded, the tool is engaged with the radially projecting area or areas of the gear workpiece and damages it or is itself damaged. Because of the disruptive profile of the gear workpiece, the permissible axis intersection angle in fine machining may be very small in these instances. But the cutting relationships deteriorate increasingly with decrease in the axis intersection angle, since the axial component of relative movement of the tool and gear workpiece becomes increasingly smaller. Since the helix angle of the dressing wheel is the same as that of the gear workpiece, the same helix angle is used in dressing of the tool as in machining of the gear workpiece, so that unfavorable cutting conditions also prevail. The quality of the dressed tool and accordingly that of the gear workpieces subsequently machined with it are as a result often unsatisfactory.

The object of the invention is to improve the process indicated above so as to make it possible to achieve more favorable cutting conditions during dressing of the tool.

SUMMARY OF THE INVENTION

The achievement of more favorable cutting conditions during dressing is attained by use of a dressing wheel with a helix angle differing from that of the gear workpiece, an axis intersection angle being set for the dressing wheel which differs from that for fine machining of the gear workpieces, in order to obtain the assigned helix angle of the tool.

The invention makes use of the fact that in order to achieve the desired helix angle it is not necessary for the helix angle of the dressing wheel to coincide with that of the gear workpiece and for the axis intersection angle to be the same as in fine machining of the gear workpiece. Since the dressing wheel and the tool have no disruptive profile, no limit is imposed on the axis intersection angle during dressing. Consequently, the tool may be dressed with an axis intersection angle which is more favorable, that is, a larger axis intersection angle with respect to the cutting conditions than in fine machining of a gear workpiece. This results in a dressed tool, and accordingly gear workpieces machined with it, of better quality. With a larger axis intersection angle the axial velocity component on the rolling circles increases, something which generally enhances transfer of the flank geometry of the dressing wheel to the tool and results in more uniform results and in longer tool life. The forces arising during dressing are reduced in the rolling circle area in particular. Hence the life of the dressing wheel is increased. The improved dressing result achieved under the more favorable cutting conditions is transferred to the gear workpiece during machining. Generally, then, more gear workpieces can be machined before dressing of the tool becomes necessary.

As was stated in the foregoing, the invention makes it possible to improve the cutting conditions in dressing of a tool in comparison to those prevailing during machining of the gear workpiece. This improvement in cutting conditions may be based not only on increase in the axis intersection angle but also on modification of the helix angle of the dressing wheel. For example, a tool used for fine machining of spur-toothed gear workpieces may be dressed by suitable selection of the axis intersection angle in dressing with a helical dressing wheel. A helical dressing wheel is more favorable than a spur-toothed dressing wheel from the viewpoint of machining conditions.

The axis intersection angle required for achievement of an assigned tool helix angle may be calculated on the basis of the helix angle of the dressing wheel and set manually. By preference, however, the axis intersection angle necessary for dressing is calculated by the machine control unit on the basis of the toothing data of tool and dressing wheel and is assigned by the unit.

BRIEF DESCRIPTION OF THE DRAWINGS

FIG. 3 illustrates a diagram of a tool and dressing wheel in rolling engagement.

FIG. 4 shows a diagram of a gear workpiece and a tool engaged with

DETAILED DESCRIPTION OF THE INVENTION

The invention is described in what follows on the basis of an exemplary embodiment.

Figure 1:
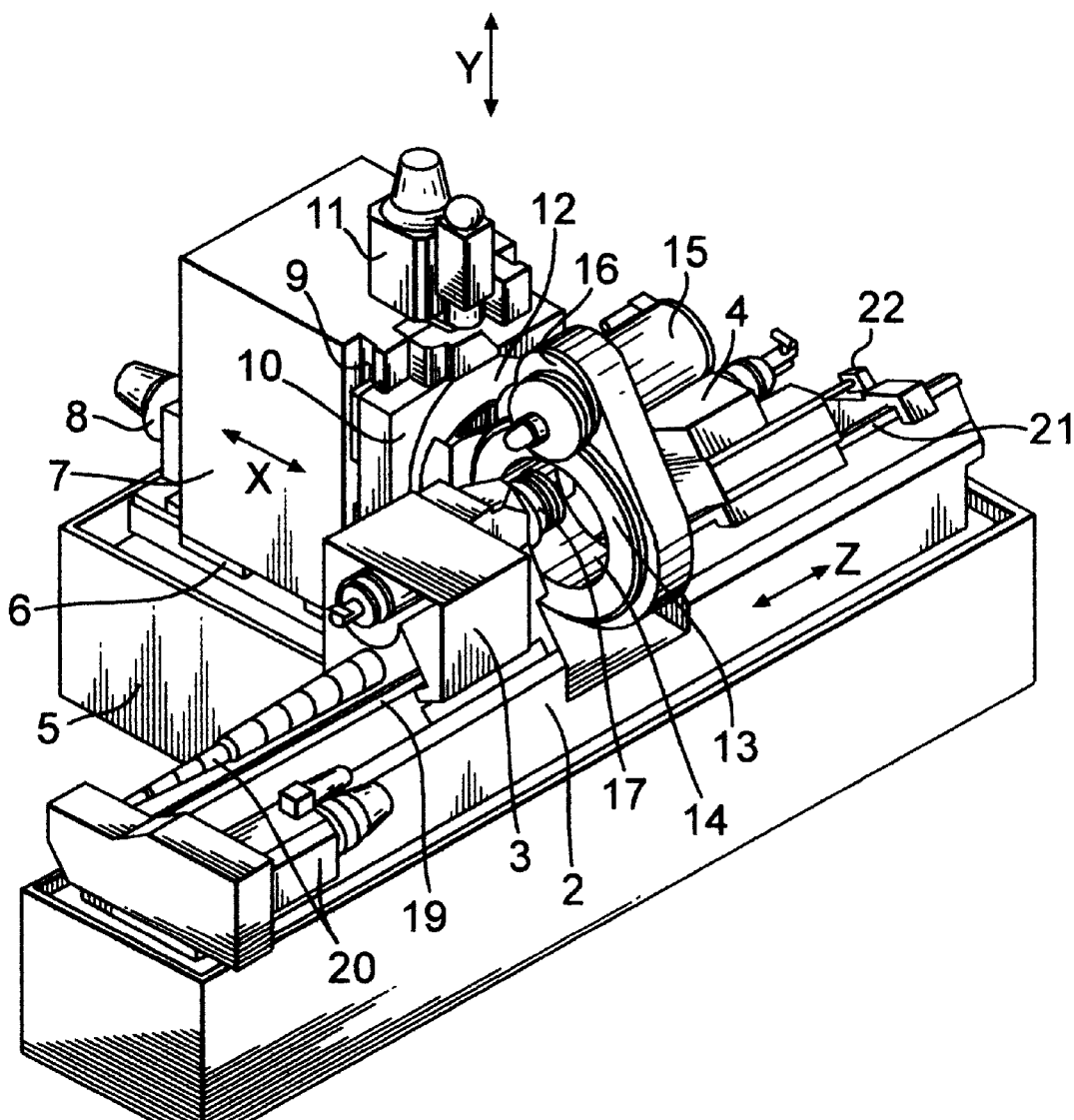
FIG. 1 shows a honing machine on which the inventive process may be carried out.
Figure 2:
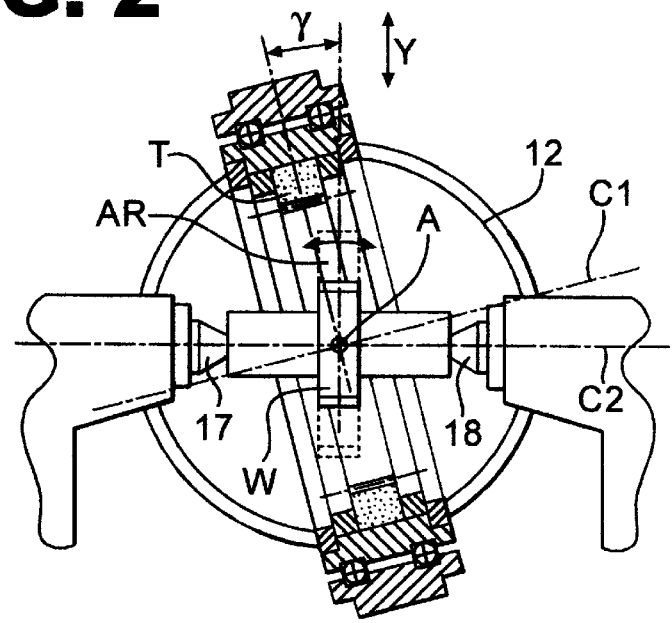
FIG. 2 illustrates a vertical section through the working area of the machine shown in FIG. 1.
Figure 2:
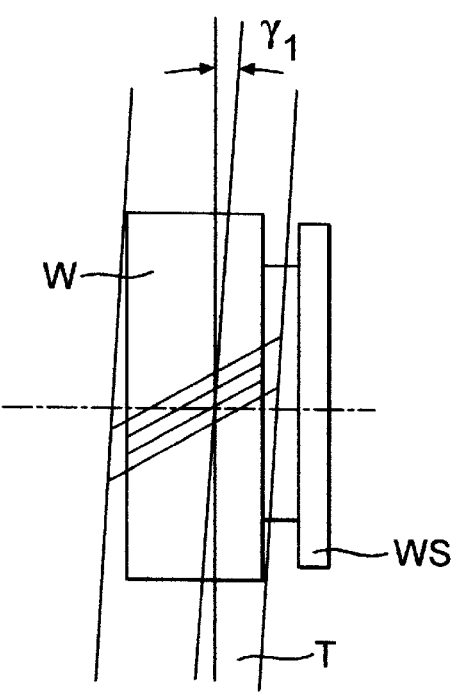

FIG. 1 shows a conventional honing machine for fine machining of tooth profiles of gear workpieces herein designated as gear workpieces. A machine frame 1 in the shape of a T in plan is in front designed as an engine bed 2 on which a headstock 3 and a tailstock 4 are movably mounted. In the rear area 5 of the machine frame 1 a horizontal slide 7 is mounted in a longitudinal guide 6 so as to be movable in arrow direction X and for this purpose may be powered by a motor 8. On its side facing the bed 2 the horizontal slide 7 has a vertical guide 9 in which a vertical slide 10 is mounted so as to be vertically adjustable in arrow direction Y and for this purpose may be powered by a motor 11. On the side facing away from the horizontal slide 7 the vertical slide 10 has a circular guide 12 merely indicated in FIG. 1 which receives a tool head 13 whose angle may be set around an axis A extending in direction X. The tool head 13 projects inward more or less between the headstock 3 and the tailstock 4. Disposed in a central opening 14 of the tool head 13 so as to be rotatable is an internal honing gear or hard metal shaving cutter or similar fine machining tool, designated as tool T, which on its tooth profiles has an abrasive surface, that is, one having no geometrically defined cutting edges, for fine machining of specially hardened gear workpieces W. Power is provided for this purpose by a motor 15 by way of a zero-play transmission 16.

The headstock 3 and tailstock 4 are provided with devices 17, 18 each for chucking a gear workpiece W whose cogs mesh with the gearing of tool T when being machined inside the tool. The gear workpiece axis C2, axis A referred to, and, with the tool T not swung into position, the tool axis C1 are disposed in a single plane. To replace the gear workpiece W the latter is disengaged and removed from the tool T. For this purpose the headstock 3 may be moved on the bed 2 in a guide 19 by means of a drive 20 in arrow direction Z, while the tailstock 4 also follows in a guide 21 in arrow direction Z, for which purpose a control unit not shown and a hydraulic drive 22 are provided.

Each of the arrow directions X, Y, and Z extends at a right angle to the other two directions.

In fine machining with gear tools the machining process is generally conducted with an axis intersection angle (i.e. cross axis angle) $Y_1$ between the tool axis C1 and the gear workpiece axis C2. For this purpose the tool head 13 is pivoted with tool T around the axis A, so that the axis C1 is disposed at an angle to the axis C2 which always extends in arrow direction Z. Feed movement of the tool T relative to the gear workpiece W for the purpose of varying the center distance is accomplished by moving the horizontal slide 7 in arrow direction X.

When an assigned number of gear workpieces W has been machined, the tool T must be dressed in order to maintain or restore its cutting capacity. For this purpose a dressing wheel AR is introduced into the machine in place of the next gear workpiece W, either manually or by mechanisms not shown and is chucked as is a gear workpiece. For the purpose of dressing the tool T is rotated while meshed with the dressing wheel AR.

In accordance with the state of the art a dressing wheel AR is used for dressing the tool T, one which is identical to the gear workpiece W with respect to basic gearing data, in particular the helix angle of the gearing. Consequently, in dressing of the tool T machining is conducted with the same axis intersection angle $\gamma_1$ between the tool axis C1 and the axis C2 of the dressing wheel AR.

The drawing in FIG. 4 illustrates the machining of a gear workpiece W which on the right side has a radially projecting ring shoulder WS. This ring shoulder WS forms a so-called disruptive profile which must not come in contact with the tool T. Hence natural limits are imposed on the maximum axis intersection angle $\gamma_1$. In the example shown in FIG. 4 the maximum permissible axis intersection angle $\gamma_1$ is 5°. At such a low axis intersection angle the relative movement between tool T and gear workpiece W has a very small axial component, something which results in unfavorable cutting relationships.

The following formula applies to the intersection angle $\beta_T$ of the tool T:

$$\beta_T \approx \beta_W + \gamma_1$$

In the example shown the helix angle $\beta^W$ of the gear workpiece W is 30°, so that a value of around 35° is obtained for the helix angle $\beta_T$ on the basis of this formula.

As has already been pointed out in the foregoing, up to the present it has been customary to use for dressing the tool T a dressing wheel AR which has been identical to the gear workpiece W with respect to the basic gearing data, the helix angle in particular. Consequently, dressing of the tool has also been carried out at axis intersection angle $\gamma_1$, with the result that the same unfavorable cutting conditions have been present as in fine machining of the gear workpiece. In accordance with the invention provision is made such that dressing of the tool T may be carried out under conditions more favorable than those prevailing for fine machining of the gear workpiece W. Since the tool T, unlike the gear workpiece W, has no disruptive profile, dressing of the tool may be carried out at a more favorable, that is, larger, axis intersection angle $\gamma_2$ of approximately 12°. The following formula applies to the helix angle $\beta_{AR}$ of the smoothing wheel (dressing wheel) AR:

$$\beta_{AR} \approx \beta_T - \gamma_2$$

A value of about 23° is accordingly obtained for the helix angle $\beta_{AR}$ of the smoothing wheel AR.

The foregoing example shows that dressing of the fine machining tool may be carried out under conditions more favorable than those for machining the gear workpiece by using a dressing wheel whose helix angle differs from that of the gear workpiece. In the case under discussion this would result in a larger axis intersection angle enhancing the dressing. The use of a dressing wheel with a helix angle differing from that of the gear workpiece may also prove to be advantageous if the helix angle rather than the axis intersection angle is the cause of unfavorable machining conditions.

Dressing of an internal gear fine machining tool has been explained in the foregoing. The expert may perceive, however, that the invention may be applied with equal advantage to external gear fine machining tools as well.

What is claimed is:

1. A process for dressing an internal or external gear tool (T) with a dressing wheel (AR) in a machine for fine machining tooth profiles of a gear workpiece (W), said tool having an axis of rotation C1, said dressing wheel having an axis of rotation C2 and said workpiece having an axis of rotation and a helix angle $\beta_W$, said dressing process comprising:

mounting said dressing wheel (AR) in said machine, positioning said tool relative to said dressing wheel whereby said tool axis C1 and said dressing wheel axis C2 are oriented at an axis intersection angle $\gamma_2$, said angle $\gamma_2$ being different from an axis intersection angle $\gamma_1$ between the tool axis C1 and the axis of the workpiece (W) during the fine machining of said gear workpiece (W), rotating said dressing wheel (AR) and said tool (T), engaging said dressing wheel (AR) with said tool (T), said dressing wheel having a helix angle $\beta_{AR}$ differing from the helix angle $\beta_W$ of said gear workpiece (W), dressing said tool (T) whereby a helix angle $\beta_T$ is produced on said tool (T) for fine machining said gear workpiece (W).

2. The process of claim 1 wherein the axis intersection angle $\gamma_2$ is calculated and set by a machine control unit on the basis of gearing data of the tool and dressing wheel.

3. The process of claim 1 wherein said tool comprises a honing tool.

* * * * *